UNITED STATES PATENT OFFICE.

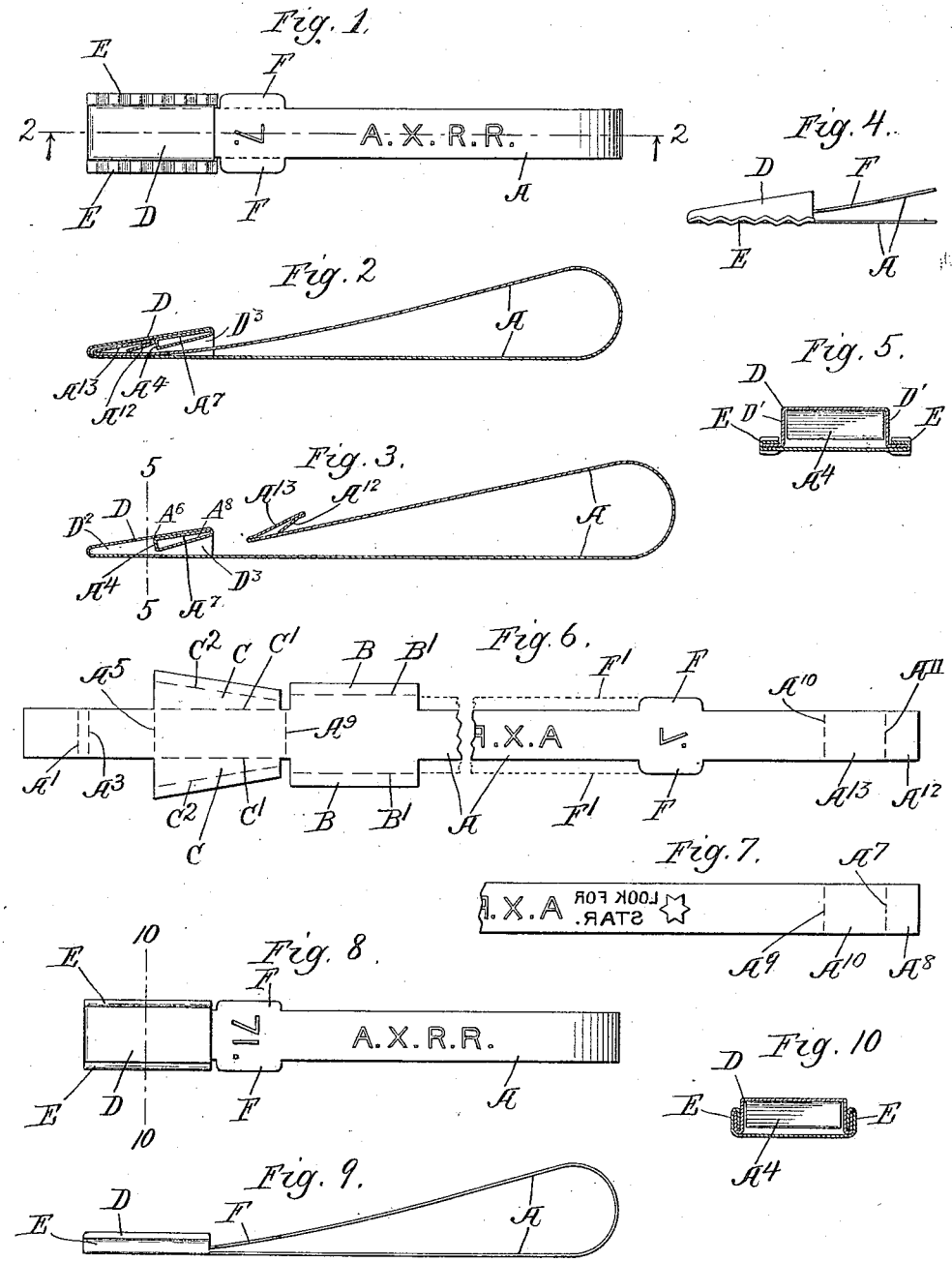

WILLIAM R. MORSE, OF CHICAGO, ILLINOIS.

CAR-SEAL.

965,924.  Specification of Letters Patent.  Patented Aug. 2, 1910.

Application filed November 6, 1902. Serial No. 130,336.

*To all whom it may concern:*

Be it known that I, WILLIAM R. MORSE, a citizen of the United States, residing at Chicago, in the county of Cook and State of Illinois, have invented certain new and useful Improvements in Car-Seals, of which the following is a specification.

My invention relates to seals and the like and its general object is to improve upon strap or sheet metal seals to the end of making possible their adoption as a desirable substitute for all forms of seals which require seal presses or special tools in connection with their employment.

As a general rule sheet metal seals heretofore constructed have been impracticable for several reasons, among which may be named excessive cost of manufacture, lack of simplicity, complicated operation, multiplicity of parts which required to be soldered or brazed together, failure to withstand the wear and tear of ordinary handling which tended to make them inoperative if partly crushed, etc. So far as I am aware all seals of this class heretofore constructed have been weak in the socket portion by not having the material so disposed as to enable the hollow body to withstand reasonable crushing force, or to permit of its being partly crushed without making the device as a whole inoperative.

With the foregoing in view one of the particular objects of my invention is to provide a sheet metal seal capable of withstanding a reasonable amount of abuse or crushing without destroying its operativeness.

Another object is to retain the well known idea of a socket with an inwardly tapering opening providing a comparatively large mouth for the reception of the complemental interlocking part or hook and a narrow throat substantially closing the interior portion of the socket, and at the same time make said tapered portion an element of added strength or support for the walls of the socket.

Another object of the invention is to provide a spring hook or catch for the opposite end of the seal which shall have the support of three thicknesses or layers of metal against being bent longitudinally as well as laterally whereby it will not be readily closed up when accidentally stepped upon.

A still further object is to provide a construction embodying the foregoing ideas, wherein the interlocking parts are formed by folding the metal as distinguished from the idea of stamping pockets or recesses, which is impracticable for commercial use for the reason that the cheap material which alone is available for such purposes—such as scrap tin and the like—does not possess sufficient ductility to withstand the operations of pocket-forming dies. And still further objects are to provide a seal such as described wherein the hook or catch and the socket interlock positively and substantially against relative movement and which shall obviate the necessity for perforations, or lips, tongues or catches punched out of the body of the material, which tend to weaken the seal as a whole and are easily flattened or disarranged.

My invention will be more readily understood by reference to the accompanying drawings forming a part of this specification and in which—

Figure 1 is a plan view showing the seal in its locked position. Fig. 2 is a section on line 2—2 of Fig. 1. Fig. 3 is a similar view, showing the seal unlocked. Fig. 4 is an edge view of a portion of the seal. Fig. 5 is a section on line 5—5 of Fig. 3, on a larger scale. Fig. 6 is a plan view of the blank before it is folded to form the seal. Fig. 7 is a view of a portion of the blank showing a modification thereof. Fig. 8 is a plan view showing a modified form of seal. Fig. 9 is an edge view of the same. Fig. 10 is a section on line 10—10 of Fig. 8.

In the drawings A is a strap, consisting of a single piece of sheet metal, having the laterally projecting parts B and C near one end. These parts are folded to form the edges $D'$ $D'$ of the body, chambered head or socket D of the seal. The end portion of the strap near the projections B and C is first folded at the place indicated by the dotted line $A^1$, then at $A^3$, then at $A^5$ to form the wedge-shaped abutment $A^4$, which has a substantially vertical wall $A^6$ and walls $A^7$ and $A^8$ substantially at right angles to said vertical wall. The abutment $A^4$ thus divides the space within the head or socket D into an inner chamber $D^2$ with a flaring mouth $D^3$ tapering inwardly and constituting the opening leading into the chamber $D^2$. Next the part C is folded upwardly at the places indicated by the dotted lines $C^1$ $C^1$ and then outwardly at the dotted lines $C^2$ $C^2$, thereby forming flanges. The next fold is made at $A^9$ bringing the flanges of the projecting parts C C down upon the parts B B, which are then folded upward on the line $B^1$ $B^1$ over the flanges, thereby forming the double flanges and completing the seal without the use of solder. The flanges may be crimped as shown in Figs. 1 and 4 to further strengthen the body and make it impossible to open the body of the seal by unfolding the flanges. The other end of the strap A is folded downward, first at the dotted line $A^{11}$ to form the spring lip $A^{12}$, then at $A^{10}$ to form a strut or brace taking the form of a spring hook or catch $A^{13}$. Spring lip, or spur, or tongue $A^{12}$ is adapted to hold the hook or catch $A^{13}$ at its free end away from the strap. The folds at $A^{10}$ and $A^{11}$ are made acute so as to support the resultant hook and lip from being closed up when accidentally stepped upon as frequently happens to hooks and the like with rounded folds. A short distance from the fold $A^{10}$ are formed projecting parts F, F, though these form no part of my invention.

The use and operation of the seal are as follows: The hook end of the strap is passed through the staple or bolt of a car door fastening device, or other similar locking means, and is then inserted in the open mouth $D^3$ of the body or socket and forced through the narrow throat into the chamber $D^2$. The strut hook or catch $A^{13}$ and its spring support or lip $A^{12}$ spring back into their normal position and occupy the entire chamber and the catch or hook end of the seal is braced against outward movement by the strut $A^{13}$ abutting against the wall $A^6$ of the abutment or interior shoulder $A^4$. The purpose of the wall $A^7$ of the abutment or shoulder is to support the wall $A^6$ at its upper edge, the wall $A^8$ serving in a like capacity for the lower edge of said wall $A^6$. The top and bottom sides of the socket or body D are substantially reinforced by the walls of the triangular abutment $A^4$ and said abutment serves as a most efficient support for both side and edge walls of the socket, which are thereby enabled to withstand an exceptional amount of crushing force; in fact stepping upon the seal lying on the ground with sufficient force to press it into the earth would not ordinarily interfere with the operativeness of the device or close the chamber $D^2$. The same is true of the catch and its spring support at the opposite end. On the other hand if the vertical wall $A^6$ were bent parallel with the wall $A^8$ (wall $A^7$ being omitted) to form a hook, like in other seals of this class, said hook would not only fail to support the walls of the socket against collapse, but would be closed up and made inoperative. Being inaccessible it could not be straightened into normal position. By providing the abutment $A^4$ the unsupported socket space is reduced by substantially one-half the size of the common form of socket having a flared mouth $D^3$, said space being limited between the wall $A^6$ and the bottom end of the chamber $D^2$. The projecting parts F F, which lie close to the seal socket when the seal is locked, prevent cutting the strap close to the seal body and then inserting the cut end without showing any mutilation of the seal. The hook portion held within the socket may also be made of narrower width than the rest of the strap A to attain the same end.

A modified form in shown in Fig. 7 where, instead of the projections F F, a star or other marking might be cut or stamped in the strap, so that when locked it would show just outside the body of the seal. In any instance where such marking was not visible, the inspector would know instantly that the lock had been tampered with.

Figs. 8, 9 and 10 show a further modification of the seal body, the blank being so cut and folded as to form a rectangular body instead of the triangular body shown in the first form. Instead of crimping the flanges they are folded up so as to lie close against the sides of the body. The projections F F may be formed as indicated by the dotted lines $F^1$ $F^1$ on Fig. 6.

Having thus described my invention, I claim as new and desire to secure by Letters Patent:

1. In a seal, a strip of metal having a folded socket at one end and a hook or catch at the opposite end, said socket having an inwardly projecting wall wholly within said socket and substantially perpendicular to the sides of said socket forming an abutment to be engaged by the catch, and an interior chamber provided with a flared mouth.

2. In a seal, a strip of metal having a hook at one end provided with a spring lip or spur supporting said hook away from the body of the strip, said strip being folded at the opposite end into a socket with a partition wall entirely within said socket and perpendicular to the sides thereof, said partition wall arranged to serve as an abutment to be engaged by said catch.

3. In a seal, a strip of metal having folded portions constituting interlocking socket and hook portions, said socket having an interior chamber adapted to closely confine said hook, a wedge-shaped abutment substantially closing said chamber and a flared mouth for same.

4. In a seal, a strip of metal having a socket at one end and a hook at the other end, one of the sides of said socket being extended and the extension inwardly folded so that it divides the interior of said socket into an inner chamber and a flared mouth leading into said inner chamber, said extended and inwardly folded side being arranged to provide a hook-engaging abutment which is perpendicular to the sides of said socket.

5. In a seal, a strip of metal having a socket, an abutment within said socket, said abutment providing a stop or shoulder perpendicular to the sides of said socket and also providing an inclined wall which forms a tapered mouth or opening for said socket, and a hook substantially filling the socket between the bottom thereof and said abutment.

6. A strip of metal folded into a seal having a socket at one end and a hook at the other end, said socket having a three-sided abutment projecting from its inner walls and tapering to the outer edge of said socket.

7. In a seal, the combination of a body portion and a strap portion formed of one piece of sheet metal, the body portion closed at one end and having an interior shoulder remote from the open end, the strap portion having at its free end a double spring hook or catch to be confined within the space between said shoulder and closed end.

8. In a seal, the combination of a socket-portion and a strap portion, the former having a shoulder projecting perpendicularly to the sides of said socket, the free end of the strap portion being formed into a hook which serves as a strut or diagonal brace which abuts against said shoulder, said strut consisting of an acute-angle bend and provided with an acute-angle rebend serving as a strut-support between the free end of said strut and the strap portion.

9. In a seal, a strip of sheet metal having a socket with an abutment between its ends partially closing the opening into said socket, said socket and abutment consisting of folded portions of said strip, and a hook having a supporting lip adapted to be irremovably held by and between said abutment and the end of the socket.

WILLIAM R. MORSE.

Witnesses:
HOMER L. KRAFT,
EDWARD T. WRAY.